(12) United States Patent
Beausoleil, Jr. et al.

(10) Patent No.: US 7,449,672 B2
(45) Date of Patent: Nov. 11, 2008

(54) CONVERSION OF QUANTUM INFORMATION FROM ONE PHOTONIC REPRESENTATION TO ANOTHER PHOTONIC REPRESENTATION

(75) Inventors: Raymond G. Beausoleil, Jr., Redmond, WA (US); William J. Munro, Bristol (GB); Timothy P. Spiller, Bristol (GB); Kae Nemoto, Tokyo (JP)

(73) Assignee: Hewlett-Packard Development Company, L.P., Houston (JP)

( * ) Notice: Subject to any disclaimer, the term of this patent is extended or adjusted under 35 U.S.C. 154(b) by 938 days.

(21) Appl. No.: 10/837,129

(22) Filed: Apr. 30, 2004

(65) Prior Publication Data

US 2005/0254823 A1 Nov. 17, 2005

(51) Int. Cl.
*H01J 40/14* (2006.01)
(52) U.S. Cl. .................................... 250/225; 250/214 R
(58) Field of Classification Search ................ 250/225, 250/214.1, 214 R, 216, 227.11; 359/117, 359/118, 146–154, 180, 181, 244–252, 275, 359/285; 372/12, 19, 54, 95–98; 455/14, 455/23, 523
See application file for complete search history.

(56) References Cited

U.S. PATENT DOCUMENTS 6,989,523 B2 * 1/2006 Beausoleil et al. ....... 250/214.1

7,220,954 B2 * 5/2007 Kuzmich et al. ......... 250/214.1

OTHER PUBLICATIONS

Kumar P—"Quantum Frequency Conversion"—Optics Letter USA—vol. 15 No. 24—Dec. 15, 1990—pp. 1476-1478.
Vandevender A P et al—"High-Efficiency Single Photon Detection via Frequency Up-Conversion"—Proc of the SPIE—vol. 5105-2003—pp. 216-224.
Xiaoguang Wang—Continous-Variable and Hybrid Quantum Gates—Journal of Physics A—vol. 34 No. 44—Nov. 9, 2001—pp. 9577-9584.
Clausen J et al—"Quantum State Conversion by Cross-Kerr Interaction"—Journal of Optics B: Quantum and Semiclassical Optics—vol. 4 No. 2—Apr. 2002—pp. 155-163.
Moussa M H Y—"Teleporation with Identity Interchange of Quantum States"—Physical Review A—vol. 55 No. 5 May 1997—pp. R3287-R3290.
Xinlan Zhou et al—"Methodology for Quantum Logic Gate Construction"—Physical Review A—vol. 62 No. 5—Nov. 2000—pp. 052316-1-12.
Langford, Nathan K. et al., "Entangled qutrits: production and characterisation" arXiv:quant-ph/0312072v1 pp. 1-5 (Dec. 9, 2003).
Mair, Alois et al., "Entanglement of Orbital Angular Momentum States of Photons" arXiv:quant-ph/0104070v3, pp. 1-15 (Feb. 21, 2002).
Nielsen, Michael A. and Chuang, Isaac L., "Quantum Computation and Quantum Information", Cambridge University Press, Cambridge, pp. 17-28 (2000).

* cited by examiner

*Primary Examiner*—Que T Le

(57) ABSTRACT

Systems and methods convert or transfer quantum information from one photonic representation or state to another. This permits conversion of quantum information from one encoding to another and to representations that are convenient, efficient, or required for desired manipulations.

19 Claims, 4 Drawing Sheets

CONVERSION OF QUANTUM INFORMATION FROM ONE PHOTONIC REPRESENTATION TO ANOTHER PHOTONIC REPRESENTATION

BACKGROUND

Photonic systems provide a variety of different physical representations for quantum information. One type of physical representation uses the polarization of photons to encode quantum information. In particular, each photon has a polarization state that can be expressed as a linear combination of two basis states associated with orthogonal polarizations (e.g., horizontal and vertical polarization states |H> and |V> or right and left circularly polarized states |R> and |L>). A quantum information processing system can use the two orthogonal polarization states of a photon as the basis state values |0> and |1> of a qubit. In some alternative physical representations, a qubit has basis state values |0> and |1> corresponding to orthogonal eigen states of orbital angular momentum of a photon, the presence or the absence of a photon in a single spatial channel or time bin, or to the alternative presence of a single photon in one or the other of two spatial channels or in one or the other of two time bins.

More generally, quantum information is not limited to qubits. A qudit, for example, refers to quantum information represented using d discrete basis states, and a qunat refers to quantum information represented using a continuous range of basis states. One photonic representation of a qudit uses the alternative presence of a single photon in any one of d distinct spatial channels or of d distinct time bins. Alternatively, the Fock states (e.g., states |0> to |d−1>) containing definite numbers (e.g., 0 to d−1) of photons can be the basis states for encoding qudit having any desired number d of discrete values, and the orbital angular momentum of states containing one or more photons can similarly represent three or more discrete values of a qudit. Similarly, a qunat can be physically represented using photons having a continuous range of eigen values for an operator such as position or momentum or approximately represented using coherent or squeezed photon states |α> corresponding to a continuous quantum variable α. Many other representations of quantum information such as qubits, qudits, and qunats are possible using photonic systems. The entanglement of photon states is another general form of quantum information that can be physically represented using many types of photon states.

Quantum information processing generally manipulates quantum states to perform tasks such as calculations or communications, storage, or measurement of quantum information. For example, a system that manipulates quantum states can implement a variety of logical operations that are often associated with the quantum gates. However, an implementation of one quantum gate may be more efficient for one physical representation of quantum information, while another quantum gate is more difficult to implement for that physical representation. More specifically, a first quantum gate for a qubit, for example, may be most easily implemented if the qubit is represented with photons of one frequency, but a second quantum gate may be more efficiently implemented if the qubit is represented using photons having a different frequency. Specific implementations of systems that store or measure quantum information may similarly be most efficient or easiest to implement for a specific physical representation of the quantum information. Accordingly, the choice of a fixed physical representation (e.g., of the frequency and the encoding of photons used to represent the quantum information) may limit the availability or efficiency of a quantum information processing system.

SUMMARY

In accordance with an aspect of the invention, systems or methods convert or transfer quantum information from one photonic representation or state to another. This permits conversion of quantum information to representations that are convenient, efficient, or required for desired manipulations.

BRIEF DESCRIPTION OF THE DRAWINGS

Use of the same reference symbols in different figures indicates similar or identical items.

DETAILED DESCRIPTION

In accordance with an aspect of the invention, a quantum information processing system can convert or transfer quantum information from one physical photonic representation to another. A general conversion transfers the quantum information such as a qubit, qudit, qunat, or state entanglement from a first encoded photon state to a second encoded photon state. The conversion can change the encoding and/or the properties of the underlying photons. In one specific embodiment, the information encoded using photons of a first frequency is transferred to an encoded state of one or more photons having a second frequency. As described further below, some alternative implementations of the state converters can be based on swap gates, teleporters, or an optical system that provides an effective Hamiltonian that transfers the quantum information from one state to another.

Figure 1A:
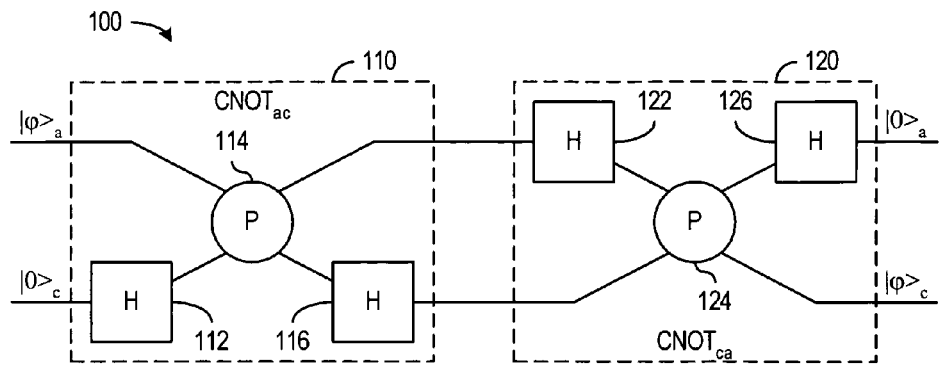
FIG. 1A is a block diagram of a state converter in accordance with an embodiment of the invention using CNOT gates for conversion of a qubit from one photonic representation to another photonic representation.

FIG. 1A illustrates a converter 100 including a swap gate formed using a pair of controlled NOT (or CNOT) gates 110 and 120. The input to converter 100 is a product of a state |φ>$_a$ representing a qubit for conversion and a known state |0>$_c$ as shown in Equation 1. The state |φ>$_a$ being converted is a linear combination of basis states $|0\rangle_a$ and $|1\rangle_a$ in an "a-channel" that uses a first photonic representation of a qubit. State $|0\rangle_c$ is a known state in a "c-channel" that provides a second photonic representation for a qubit. For example, basis states $|0\rangle_a$ and $|1\rangle_a$ can be orthogonal polarization states $|H\rangle_a$ and $|V\rangle_a$ of a photon having frequency $\omega_a$, while state $|0\rangle_c$ is one of two orthogonal polarization states $|H\rangle_c$ and $|V\rangle_c$ of a photon having an angular frequency $\omega_c$. Coefficients $C_0$ and $C_1$ in Equation 1, which are generally complex values, indicate the quantum information that is encoded in state $|\phi\rangle_a$ and that converter 100 transfers to a state $|\phi\rangle_c$ in the c-channel.

$$|\phi\rangle_a \otimes |0\rangle_c = [C_0|0\rangle_a + C_1|1\rangle_a] \otimes |0\rangle_c \qquad \text{Equation 1}$$

State $|\phi\rangle_a$ in the a-channel controls $CNOT_{ac}$ gate 110, which changes the initial product state as indicated in Equation 2. The state in the c-channel then controls $CNOT_{ca}$ gate 120 and changes the resulting product state from $CNOT_{ac}$ gate 110 as indicated in Equation 3. As a result of the operation of CNOT gates 110 and 120, the quantum information reflected by probability amplitudes $C_0$ and $C_1$ of state $|\phi\rangle_a$ are transferred to an output state $|\phi\rangle_c$ in the second channel. The state $|0\rangle_a$ output from the a-channel is not required and can be discarded or reused elsewhere.

Equation 2:

$$|\varphi\rangle_a |0\rangle_c \equiv \{C_0|0\rangle_a + C_1|1\rangle_a\}|0\rangle_c \xrightarrow{CNOT_{ac}} C_0|0\rangle_a|0\rangle_c + C_1|1\rangle_a|1\rangle_c$$

Equation 3:

$$\xrightarrow{CNOT_{ca}} C_0|0\rangle_a|0\rangle_c + C_1|0\rangle_a|1\rangle_c = |0\rangle_a\{C_0|0\rangle_c + C_1|1\rangle_c\} \equiv |0\rangle_a|\varphi\rangle_c$$

Each CNOT gate 110 or 120 can be constructed from two Hadamard transform gates 112 and 116 or 122 and 126 and a controlled phase gate 114 or 124 as illustrated in FIG. 1A. However, CNOT gates 110 and 120 can alternatively be constructed without containing separable elements 112, 114, 116, 122, 124, and 126.

Figure 1B:
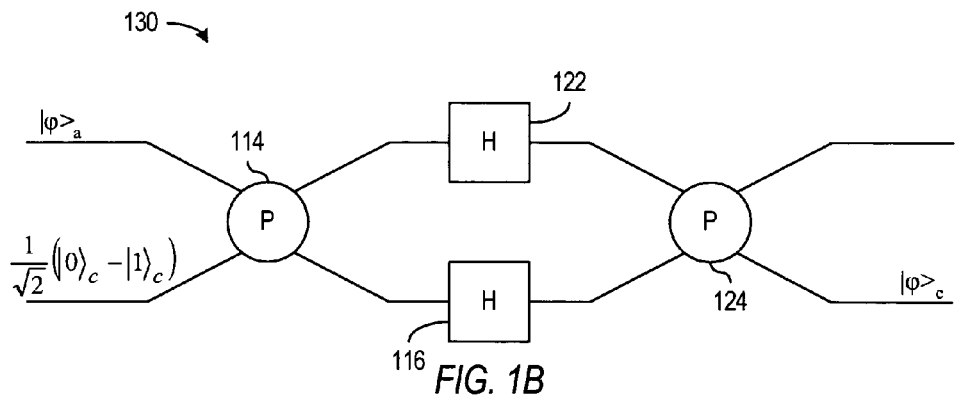
FIG. 1B is a block diagram of a state converter in accordance with an embodiment of the invention using phase gates and Hadamard transforms for conversion of a qubit from one photonic representation to another photonic representation.

FIG. 1B illustrates a converter 130 that is a simplified version of converter 100 found by eliminating elements that are unnecessary to state conversion. Converter 130 consists of two Hadamard transformation gates 122 and 116 and two controlled phase gates 114 and 124. Converter 130 contains fewer elements when compared to converter 100 of FIG. 1A because converter 130 in performing a state conversion is not required to perform a full swap. In particular, converter 130 does not require an output Hadamard transform 126 since the output state in the a-channel is simply a known photon state and may be discarded. Further, an input Hadamard transform 112 on the c-channel can be eliminated by directly preparing an input state for the c-channel of converter 130 that is the same as the output state from Hadamard transform 122 in converter 100. Accordingly, an input state for converter 130 of the form shown in Equation 4 provides a converted output state $|\phi\rangle_c$ in the c-channel. The output state in the a-channel of converter 130 can be discarded.

Equation 4:

$$|\varphi\rangle_a \otimes \frac{(|0\rangle_c - |1\rangle_c)}{\sqrt{2}} \equiv (C_0|0\rangle_a + C_1|1\rangle_a) \otimes \frac{(|0\rangle_c - |1\rangle_c)}{\sqrt{2}}$$

The physical implementations of CNOT gates 110 and 120 (or Hadamard transforms 122 and 116 and controlled phase gates 114 and 124) determine the conversions that converter 100 or 130 performs. In one specific embodiment, the a-channel states $|0\rangle_a$ and $|1\rangle_a$ correspond to states (e.g., orthogonal polarization states or alternative spatial channel states) of a photon having an angular frequency $\omega_a$, and the c-channel states $|0\rangle_c$ and $|1\rangle_c$ correspond to states (e.g., orthogonal polarization states or alternative spatial channel states) of a photon having an angular frequency $\omega_c$, and converter 100 or 130 then operates as a frequency converter for an optical quantum information signal. Such frequency conversions are particularly useful because current optical fibers are generally designed for transmission of photons having wavelengths in the 1.3 to 1.5 micron range while shorter wavelengths (e.g., about 650 nm) have the advantage of better available optical elements, for example, for single photon detection or creation.

Figure 2:
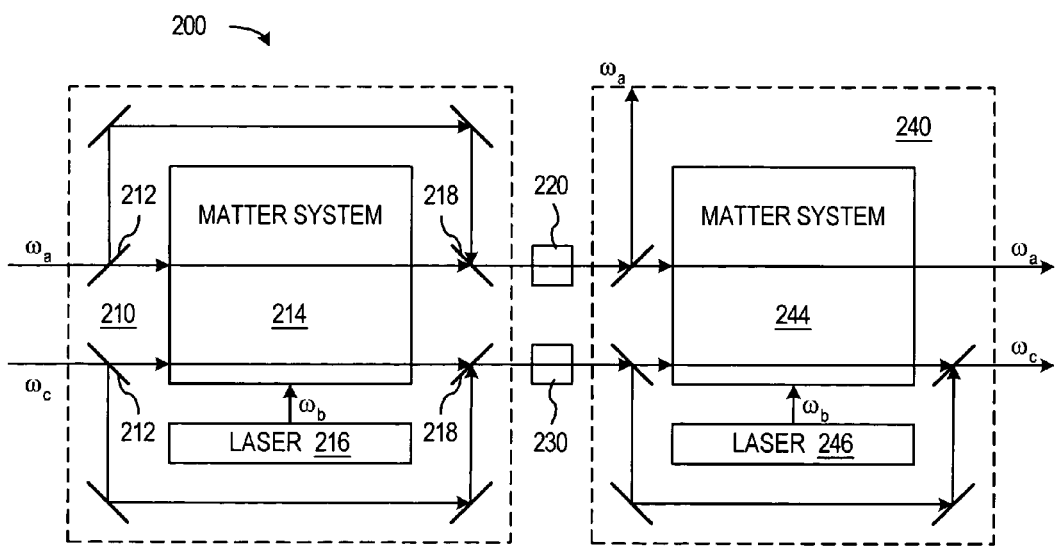
FIG. 2 is a block diagram of a state converter in accordance with an embodiment of the invention using electromagnetically induced transparency (EIT) to transfer quantum information from a photon having a first frequency to a photon having a second frequency.

FIG. 2 illustrates an example of an optical quantum state converter 200 in which the input quantum state $|\phi\rangle_a$ is in a representation where states $|0\rangle_a$ and $|1\rangle_a$ are orthogonal linear polarization states $|H\rangle_a$ and $|V\rangle_a$ of a photon having an angular frequency $\omega_a$ and the output quantum state $|\phi\rangle_c$ conveys the same quantum information as state $|\phi\rangle_a$ but in a physical representation where basis states $|0\rangle_c$ and $|1\rangle_c$ are orthogonal linear polarization states $|H\rangle_c$ and $|V\rangle_c$ of a photon having angular frequency $\omega_c$. State converter 200 of FIG. 2 includes two controlled phase gates 210 and 240 and two Hadamard gates 220 and 230. Controlled phase gates 210 and 240 in FIG. 2 are implemented using an electromagnetically induced transparency (EIT) system. Alternatively, other implementations of a controlled phase gate using devices such as linear optics with conditioning as described by Knill et al., "A Scheme for Efficient Quantum Computations with Linear Optics," Nature, Vol. 409, page 46 (2001) or a system using giant optical non-linearities with trap atoms such as described in "Generating Optical Nonlinearity using Trapped Atoms," Alexei Gilchrist, G. J. Milburn, W. J. Munro, and K. Nemoto, quant-ph/0305167 could be used.

Controlled phase gate 210 has input optics (e.g., polarizing beamsplitters 212) that direct the polarization states corresponding to states $|1\rangle_a$ and $|1\rangle_c$ into a matter system 214 having energy levels capable of creating an interaction between photons of frequencies $\omega_a$ and $\omega_c$. In particular, matter system 214 is such that the simultaneous combination of a photon in state $|1\rangle_a$ with frequency $\omega_a$ and a photon of angular frequency $\omega_c$ in matter system 214 changes the phase of the state $|1\rangle_a$ by a factor $-1$ (or $e^{i\pi}$).

Figure 3:
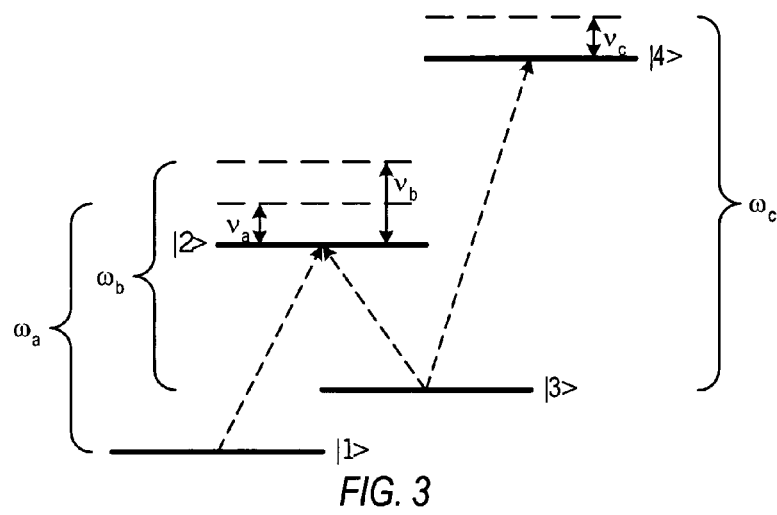
FIG. 3 is an energy level diagram for a matter system suitable for an EIT system in the state converter of FIG. 2.

One way to create the desired change in the phase of state $|1\rangle_a$ uses a four-level matter system containing atoms or molecules having energy eigenstates $|1\rangle$, $|2\rangle$, $|3\rangle$, and $|4\rangle$ with energy levels illustrated in FIG. 3. In matter system 214, state $|3\rangle$ is preferably a metastable state in that a conservation rule prohibits a single-photon transition between states $|3\rangle$ and $|1\rangle$, and spontaneous emissions causing transitions from state $|4\rangle$ are preferably suppressed, for example, by a surrounding photonic bandgap crystal. Additionally, energy differences between states $|1\rangle$ and $|2\rangle$, $|2\rangle$ and $|3\rangle$, and $|3\rangle$ and $|4\rangle$ are respectively equal to $(\omega_a - \nu_a)$, $(\omega_c - \nu_c)$, and $(\omega_b - 84_b)$, where detuning parameters $\nu_a$, $\nu_c$, and $\nu_b$ may be small. As described further in U.S. patent application Ser. No. 10/364,987, entitled "Quantum Information Processing using Electromagnetically Induced Transparency", a matter system having the energy levels of FIG. 3 and the properties just described will exhibit electromagnetically induced transparency and will change the phase of the input state when simultaneously exposed to photons of angular frequencies $\omega_a$, $\omega_b$, and $\omega_c$. Controlled phase gate 210 includes a laser 216 that provides photons of frequency $\omega_b$. With proper selection of parameters such as detuning parameters $\nu_a$, $\nu_b$, and $\nu_c$ and the number of four-level atoms or molecules that interact with the photons, the simultaneous presence of photon of angular frequencies $\omega_a$ and $\omega_c$ induces EIT and the desired change in phase of the state $|1\rangle_a|1\rangle_c$. No change in the phase occurs for input states $|0\rangle_a|0\rangle_c$, $|0\rangle_a|1\rangle_c$, or $|1\rangle_a|0\rangle_c$ because of the absence of a photon of frequency $\omega_a$ or $\omega_c$.

Hadamard gates 220 and 230 can be implemented using linear optical elements that rotate the separated polarization states. After polarization rotation, beam combining optics (e.g., polarizing beamsplitters 218) recombine the separated polarization components. Controlled phase gate 240 is implemented in the same manner as controlled phase gate 210 and includes a four-level matter system 222. A laser 224 provides photons of wavelength $\omega_b$, which permits matter system 222 to provide the desired phase change to the $|1\rangle_a$ component of the a-channel photon. The operation of Hadamard gate 220 and controlled phase gate 240 unentangle the a-channel and c-channel photon state, allowing output of the desired c-channel state $|\phi\rangle_c$.

Figure 4A:
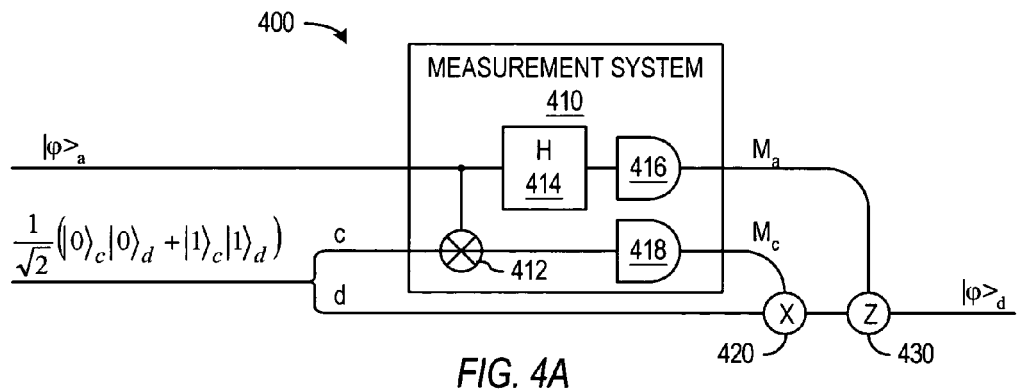
FIGS. 4A and 4B are block diagrams of state converters in accordance with embodiments of the invention using teleportation for conversion of quantum information from one photonic representation to another.

In accordance with another aspect of the invention, state conversion can alternatively be implemented using a teleporter system. FIG. 4A shows an example of a converter 400 that transfers quantum information from an optical state $|\phi\rangle_a$ using a first physical representation to an optical state $|\phi\rangle_d$ representing the same quantum information using a second physical representation. Converter 400 includes a measurement system 410, a classically switched NOT gate 420, and a classically switched Z gate 430. For the conversion, the input state is a product of state $|\phi\rangle_a$ and a known Bell state, e.g., $$\frac{1}{\sqrt{2}}(|0\rangle_c|0\rangle_d + |1\rangle_c|1\rangle_d),$$

as indicated in Equation 5. In one embodiment, the Bell state is a maximally entangled photon pair with one photon in the d-channel having the encoding of output state $|\phi\rangle_d$, and the other photon in a c-channel that interacts with input state $|\phi\rangle_a$ in measurement system 410.

Equation 5:

$$|\varphi\rangle_a \otimes \frac{(|0\rangle_c|0\rangle_d + |1\rangle_c|1\rangle_d)}{\sqrt{2}} \equiv [C_0|0\rangle_a + C_1|1\rangle_a] \otimes \frac{(|0\rangle_c|0\rangle_d + |1\rangle_c|1\rangle_d)}{\sqrt{2}}$$

In the illustrated embodiment, measurement system 410 includes a $\text{CNOT}_{ac}$ gate 412, a Hadamard gate 414, a state analyzer 416 for the a-channel photons, and a state analyzer 418 for the c-channel photons. State $|\phi\rangle_a$ controls $\text{CNOT}_{ac}$ gate 412, which operates on photons in the c-channel photons. Hadamard gate 414 then acts on state $|\phi\rangle_a$, i.e., the a-channel photons. The action of $\text{CNOT}_{ac}$ gate 412 and Hadamard gate 414 can be shown to transform the input state of Equation 5 to the form indicated in Equation 6.

Equation 6:

$$\frac{1}{2}[C_0(|0\rangle_a + |1\rangle_a)(|0\rangle_c|0\rangle_d + |1\rangle_c|1\rangle_d) +$$

$$C_1(|0\rangle_a - |1\rangle_a)(|1\rangle_c|0\rangle_d + |0\rangle_c|1\rangle_d)] =$$

$$\frac{1}{2}[|0\rangle_a|0\rangle_c(C_0|0\rangle_d + C_1|1\rangle_d) + |0\rangle_a|1\rangle_c(C_0|1\rangle_d + C_1|0\rangle_d) +$$

$$|1\rangle_a|0\rangle_c(C_0|0\rangle_d - C_1|1\rangle_d) + |1\rangle_a|1\rangle_c(C_0|1\rangle_d - C_1|0\rangle_d)]$$

State analyzers 416 and 418 respectively measure photons in the a-channel and the c-channel and thus determine whether the measured photons are in state $|0\rangle_a|0\rangle_c$, $|0\rangle_a|1\rangle_c$, $|1\rangle_a|0\rangle_c$, or $|1\rangle_a|1\rangle_c$. The measurement thus identifies whether the c-channel photons are in the state $C_0|0\rangle_c+C_1|1\rangle_c$, $C_0|1\rangle_c+C_1|0\rangle_c$, $C_0|0\rangle_c-C_1|1\rangle_c$, or $C_0|1\rangle_c-C_1|0\rangle_c$. Classical output signals $M_a$ and $M_c$ from state analyzers 416 and 418 control classically-switched NOT gate 420 and classically-switched Z gate 430. In particular, signal $M_a$ is asserted to enable Z gate 430 when the a-channel photon is in state $|1\rangle_a$, and signal $M_c$ is asserted to enable NOT gate 420 when the c-channel photon is in state $|1\rangle_c$. As a result, the final output state $|\phi\rangle_d$ is of the form $C_0|0\rangle_d+C_1|1\rangle_d$ as indicated by Table 1.

TABLE 1

| Measured ac-channel | Implied c-channel | Gate X | Gate Z | Final State |
|---|---|---|---|---|
| $0\rangle_a|0\rangle_c$ | $C_0|0\rangle_b + C_1|1\rangle_b$ | Inactive | Inactive | $C_0|0\rangle_b + C_1|1\rangle_b$ |
| $0\rangle_a|1\rangle_c$ | $C_0|1\rangle_b + C_1|0\rangle_b$ | Active | Inactive | $C_0|0\rangle_b + C_1|1\rangle_b$ |
| $1\rangle_a|0\rangle_c$ | $C_0|0\rangle_b - C_1|1\rangle_b$ | Inactive | Active | $C_0|0\rangle_b + C_1|1\rangle_b$ |
| $1\rangle_a|1\rangle_c$ | $C_0|1\rangle_b - C_1|0\rangle_b$ | Active | Active | $C_0|0\rangle_b + C_1|1\rangle_b$ |

The teleportation phenomenon is well known in the art, but in accordance with an aspect of the invention, teleportation is used to convert quantum information from one photonic representation to another. For example, for a frequency conversion, a-channel photons have a first angular frequency $\omega_a$, and c-channel photons have a second angular frequency $\omega_d$. The c-channel can include photons having a frequency $\omega_c$ that can interact with the a-channel photons in CNOT gate 412. In one specific embodiment, c-channel photons and d-channel photons have the same frequency $\omega_c$ (FIG. 4A), and a-channel photons have a different frequency $\omega_a$. CNOT gate 412 can then be implemented using EIT in a 4-level matter system such as described above in regard to FIGS. 2 and 3.

Figure 4B:
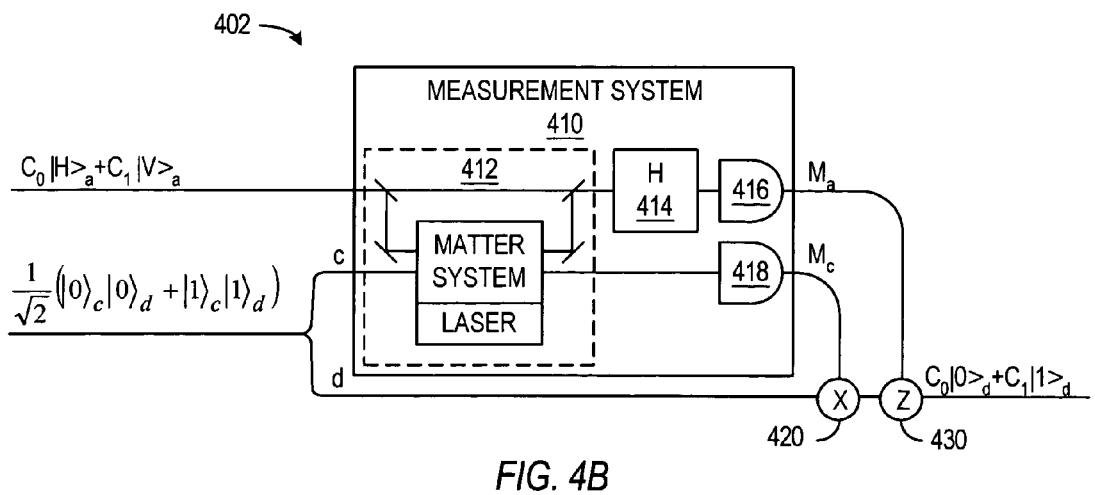

FIG. 4B illustrates a converter 402 in accordance with an embodiment of the invention that converts quantum information from a physical representation using polarization basis states $|H\rangle_a$ and $|V\rangle_a$ to a physical representation using Fock states $|0\rangle_d$ and $|\rangle_d$. The input qubit state being converted is thus of the form $C_0|H\rangle+C_1|V\rangle$. In an exemplary embodiment, the input Bell state is an entangled state that is a combination of a state $|0\rangle_c|0\rangle_d$ with no photons in the c or d channel and a state $|1\rangle_c|1\rangle_d$ corresponding to one photon in each of the c-channel and the d-channel. The c-channel uses photons having an angular frequency $\omega_c$ of FIG. 3, and the a-channel uses photons having an angular frequency $\omega_a$ of FIG. 3. Accordingly, a CNOT gate 510 can be implemented using a laser that irradiates a 4-level matter system with photons of angular frequency $\omega_b$. The a-channel has polarization splitting optics that directs the polarization corresponding to state $|V\rangle$ into the matter system and routes photons with polarization corresponding to state $|H\rangle$ around the matter system. The c-channel using a physical representation using Fock states $|0\rangle_c$ and $|1\rangle_c$ as basis states does not require polarization optics. The d-channel can use any angular frequency $\omega_d$ for which the input entangled photon state can be generated.

More generally, a converter using quantum teleportation can be used to converter to any physical representation having basis states basis state $|0\rangle_d$ and $|1\rangle_d$ that can be entangled with the basis states $|0\rangle_c$ and $|1\rangle_c$. For example, basis state $|0\rangle_d$ and $|1\rangle_d$ for the encoding in the d channel can be coherent states $|\alpha\rangle$ and $|-\alpha\rangle$. Coherent states $|\alpha\rangle$ and $|-\alpha\rangle$ can be entangled with polarization eigen states $|H\rangle_c$ and $|H\rangle_c$ or photon number eigen states using known coherent state quantum computing techniques that employ conditional logic and linear optics. Alternatively, the entanglement of Fock states with coherent states can be achieved using a system having a Hamiltonian of the form given in Equation 7, where $D(\alpha)$ is the "displacement" operator that creates coherent state $|\alpha\rangle$ from state $|0\rangle$. As a result, the Hamiltonian converts an entangled state $|0\rangle_c|0\rangle_d+|0\rangle_c|1\rangle_d$ to the entangled state $|0\rangle_c|\alpha\rangle_d+|1\rangle_c|-\alpha\rangle_d$.

$$H=D(\alpha)|0\rangle_c\langle 0|_d+|0\rangle_d\langle 0|_c D^*(\alpha)+D(-\alpha)|1\rangle_c\langle 1|_d+ |1\rangle_d\langle 1|_c D^*(-\alpha)$$ Equation 7

Figure 5A:
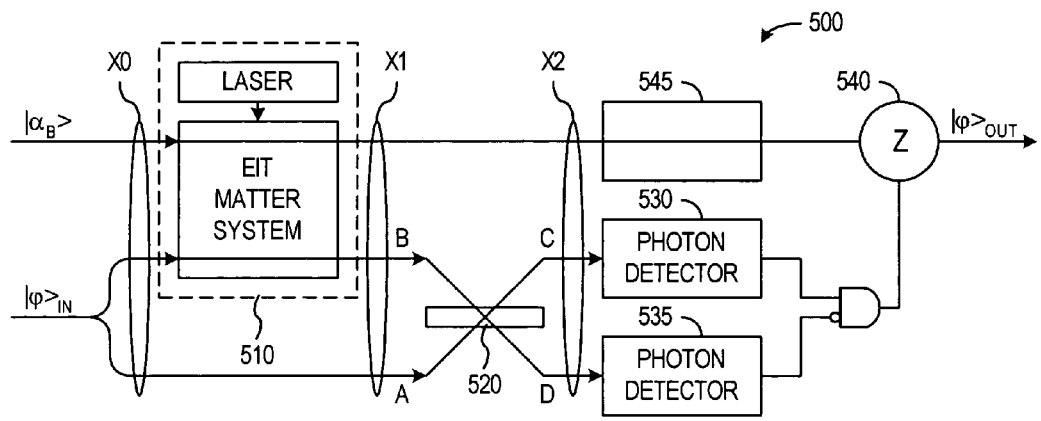
FIGS. 5A and 5B illustrate converters in accordance with embodiments of the invention that convert qubits represented using dual-rail Fock states to qunats represented using coherent photon states.

The conversion from a Fock state representation of quantum information to a coherent state representation of the quantum information is particularly useful for converting discrete quantum information such as a qubit to a representation suitable for representation of continuous quantum information (i.e., a qunat). FIG. 5A illustrates a converter 500 in accordance with an embodiment of the invention that converts a qubit from a representation using dual-rail Fock states to a representation using coherent states that are suitable for qunats. Converter 500 can accordingly convert a qubit into a corresponding qunat.

In the illustrated embodiment of converter 500, an input state $|\phi\rangle_{IN}$ is of the form given in Equation 8 where states $|0\rangle_{IN}$ and $|1\rangle_{IN}$ are the basis states of the input representation of the qubit. States $|0\rangle_A$ and $|1\rangle_A$ are Fock states respectively corresponding to 0 and 1 photon in a first spatial channel or rail A, and states $|0\rangle_B$ and $|1\rangle_B$ are Fock states respectively corresponding to 0 and 1 photon in a second spatial channel or rail B. Coefficients $C_0$ and $C_1$, which in general are complex numbers, are the quantum information that the input qubit conveys. With a coherent state $|\alpha\rangle$ input on a third spatial channel, the full input state at point X0 in converter 500 is given in Equation 9.

$$|\phi\rangle_{IN}=C_0|0\rangle_{IN}+C_1|1\rangle_{IN}=C_0|1\rangle_A|0\rangle_B+C_1|0\rangle_A|1\rangle_B$$ Equation 8

$$|\phi\rangle_{IN}\otimes|\alpha\rangle=C_0|1\rangle_A|0\rangle_B|\alpha\rangle+C_1|0\rangle_A|1\rangle_B|\alpha\rangle$$ Equation 9

Converter 500 includes a controlled phase gate 510, a 50-50 beam splitter 520, photon detectors 530 and 535, and output state correction elements 540 and 545. The B-rail photon state controls the controlled phase gate 510 that operates on the input coherent state $|\alpha\rangle$. Controlled phase gate 510, as illustrated in FIG. 5A, can be implemented using an EIT matter system having respective energy level transitions that respectively correspond to energies of photons in the B-rail state and coherent state $|\alpha\rangle$, but other implementations of a controlled phase gate could alternatively be employed. As a result of the operation of control phase gate 510 on coherent state $|\alpha\rangle$ only when a photon is present in the B-rail, the full photon state at point X1 following controlled phase gate 510 is given in Equation 10, where $\chi$ is a change in phase that controlled phase gate 510 causes.

$$|\phi\rangle_{IN}\otimes|\alpha\rangle\rightarrow C_0|1\rangle_A|0\rangle_B|\alpha\rangle+C_1|0\rangle_A|1\rangle_B|e^{i\chi}\alpha\rangle$$ Equation 10

The 50-50 beam splitter 520 mixes the A-rail and B-rail states and outputs photons through output channels or rails C and D. The resulting state after beam splitter 520 can be expressed using states $|0\rangle_C$ and $|1\rangle_C$ that are Fock states respectively corresponding to 0 and 1 photon in rail C and states $|0\rangle_D$ and $|1\rangle_D$ that are Fock states respectively corresponding to 0 and 1 photon in rail D. Equation 11 indicates the photon state after the transformation of the state from point X1 to point X2, which is after the operation of 50-50 beam splitter 520. The relative phases of terms in Equation 11 are those found when 50-50 beam splitter 520 is asymmetric. Other types of beam splitters such as a symmetric 50-50 beam splitter will provide similar results but may required phase correction that differs from the specific example described below.

Equation 11:

$$C_0|1\rangle_A|0\rangle_B|\alpha\rangle+C_1|0\rangle_A|1\rangle_B|e^{i\chi}\alpha\rangle\rightarrow$$
$$\frac{|1\rangle_C|0\rangle_D}{\sqrt{2}}(-C_0|\alpha\rangle+C_1|e^{i\chi}\alpha\rangle)+\frac{|0\rangle_C|1\rangle_D}{\sqrt{2}}(C_0|\alpha\rangle+C_1|e^{i\chi}\alpha\rangle)$$

Photon detectors 530 and 535 determine whether the photon from the input state is in the C or D channel. Efficient single photon detectors suitable for this purpose are described, for example, in "A High Efficiency Quantum Non-demolition Single Photon Number Resolving Detector," W. J. Munro, R. G. Beausoleil, and T. P. Spiller, Quant-PH/0310066. As a result of the measurement, the state collapses to $(-C_0|\alpha\rangle+C_1|e^{i\chi}\alpha\rangle)$ if a photon was measured in the C rail but not the D rail and collapses to $(C_0|\alpha\rangle+C_1|e^{i\chi}\alpha\rangle)$ if a photon was measured in the D rail but not the C rail.

Figure 5B:
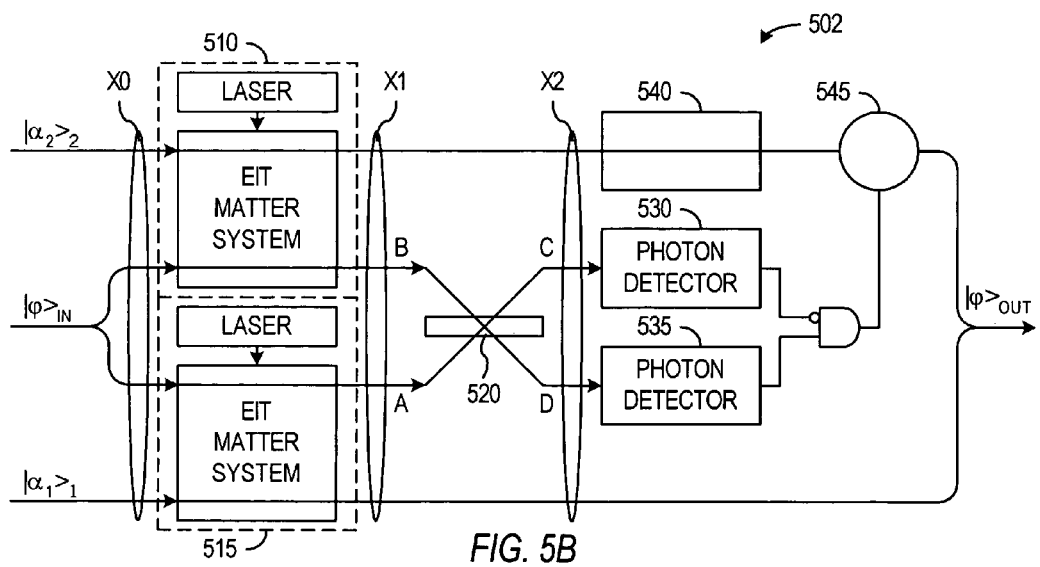

The desired form of the output state $|\phi\rangle_{OUT}$ is $(C_0|\alpha\rangle+C_1|e^{i\chi}\alpha\rangle)$, where states $|\alpha\rangle$ and $|e^{i\chi}\alpha\rangle$, e.g., $|\alpha\rangle$ and $|-\alpha\rangle$ when $\chi$ is equal to $\pi$, are the basis states $|0\rangle_{OUT}$ and $|1\rangle_{OUT}$ for qubit values within the qunat representation. State correction element 540 is a classically controlled Z gate that is activated when detector 530 detects a photon in the C rail. A Z gate for a coherent state can be implemented using the techniques presented in "Quantum Computation with Optical Coherent States," T. C. Ralph, A. Gilchrist, G. J. Milburn, W. J. Munro, and S. Glancy, Phys. Rev. A 68, 042319 (2003) or "Quantum Computation with Coherent State, Linear Interactions and Superposed Resources," T. C. Ralph, G. J. Milburn and W. J. Munro, Quant-PH/0110115. When a photon is measured in the D rail, the collapsed state has the desired form, and Z gate does nothing. When state $(-C_0|\alpha\rangle+C_1|e^{i\chi}\alpha\rangle)$ results from detection of the photon in the C rail, Z gate 540 corrects the relative phase and the final output state $|\phi\rangle_{OUT}$ is again in the desired state $(C_0|\alpha\rangle+C_1|e^{i\chi}\alpha\rangle)$. Further corrective optics 545 could be employed if necessary FIG. 5B shows a detector 502 in accordance with another embodiment of the invention for conversion of quantum information from a dual-rail Fock state representation to a representation using coherent photon states. A total input state in detector 502 is a product of the input state $|\phi\rangle_{IN}$ and two coherent states $|\alpha_1\rangle_1$ and $|\alpha_2\rangle_2$. Input state $|\phi\rangle_{IN}$ uses the dual rail representation described above to represent a qubit as indicated in Equation 12, and the full input state at point X1 in detector 502 is of the form given in Equation 12.

$$|\phi\rangle_{IN}\otimes|\alpha_1\rangle_1\otimes|\alpha_2\rangle_2=C_0|1\rangle_A|0\rangle_B|\alpha_1\rangle_1|\alpha_2\rangle_2+ C_1|0\rangle_A|1\rangle_B|\alpha_1\rangle_1|\alpha_2\rangle_2$$ Equation 12

The photon state on the A rail controls controlled phase gate 515 that operates on coherent state $|\alpha_1\rangle_1$, and the photon state on the B rail controls controlled phase gate 510 that operates on coherent state $|\alpha_2\rangle_2$. Controlled phase gates 510 and 515 can be implemented using an EIT matter system as illustrated in FIG. 5B, but other implementations of controlled phase gates could alternatively be employed. As a result of the operation of control phase gates 510 and 515 on coherent states $|\alpha_2\rangle_2$ and $|\alpha_1\rangle_1$ for the alternative presence of a photon in the A or B rail, the full photon state at point X1 in FIG. 5B is given in Equation 13, where $\chi_1$ and $\chi_2$ are the change in phase that controlled phase gates 510 and 515 respectively cause.

$$|\phi\rangle_{IN}\otimes|\alpha\rangle\rightarrow C_0|1\rangle_A|0\rangle_B|e^{i\chi_1}\alpha_1\rangle_1|\alpha_2\rangle_2+ C_1|0\rangle_A|1\rangle_B|\alpha_1\rangle_1|e^{i\chi_2}\alpha_2\rangle_2$$ Equation 13

The 50-50 beam splitter 520 mixes the A-rail and B-rail states and outputs photons through C and D rails. The full photon state after 50-50 beam splitter 520 can be expressed using states $|0\rangle_C$ and $|1\rangle_C$ that are Fock states respectively corresponding to 0 and 1 photon on rail C and states $|0\rangle_D$ and $|1\rangle_D$ that are Fock states respectively corresponding to 0 and 1 photon on rail D. Equation 14 indicates the transition of a full photon state from point X1 to point X2, which is after the operation of 50-50 beam splitter 520.

Equation 14:

$$C_0|1\rangle_A|0\rangle_B|\alpha_1 e^{i\chi_1}\rangle_1|\alpha_2\rangle_2 + C_1|0\rangle_A|1\rangle_B|\alpha_1\rangle_1|\alpha_2 e^{i\chi_2}\rangle_2 \rightarrow$$

$$\frac{|1\rangle_C|0\rangle_D}{\sqrt{2}}(-C_0|\alpha_1 e^{i\chi_1}\rangle_1|\alpha_2\rangle_2 + C_1|\alpha_1\rangle_1|\alpha_2 e^{i\chi_2}\rangle_2) +$$

$$\frac{|0\rangle_C|1\rangle_D}{\sqrt{2}}(C_0|\alpha_1 e^{i\chi_1}\rangle_1|\alpha_2\rangle_2 + C_1|\alpha_1\rangle_1|\alpha_2 e^{i\chi_2}\rangle_2)$$

Detectors 530 and 535 measure the C and D rail states to determine whether the coherent state channels are in state $(-C_0|\alpha_1 e^{i\chi_1}\rangle_1|\alpha_2\rangle_2 + C_1|\alpha_1\rangle_1|\alpha_2 e^{i\chi_2}\rangle_2)$ or state $(C_0|\alpha_1 e^{i\chi_1}\rangle_1|\alpha_2\rangle_2 + C_1|\alpha_1\rangle_1|\alpha_2 e^{i\chi_2}\rangle_2)$. State correction elements 540 and 545 can correct the phase of selected terms in the collapsed state to provide a representation of the original quantum information using entangled coherent states. More particularly, correction element 540 can perform an unconditional correction, which is not necessary in the illustrated embodiment of FIGS. 5A and 5B but may be convenient in other embodiments. For example, an embodiment using a symmetric beam splitter in place of the asymmetric beam splitter could use correction element 540 to correct both collapsed states. Correction 545 performs a conditional correction according to the collapsed state identified by the measurement.

Converters 500 and 502 of FIGS. 5A and 5B input at least one known coherent state and transfer quantum information to a representation using coherent states as basis states. The same structures could similarly convert to representations using other types of photon states such as squeezed states. For such conversions, the type of a known state $|S1\rangle$ used must be such that operation of a controlled phase gate 510 or 515 converts the known input state $|S1\rangle$ into a CNOT output state $|S2\rangle$ that is at least approximately orthogonal to the known input state. More specifically, the overlap $|\langle S2|S1\rangle|^2$ is approximately zero so that the known input state $|S1\rangle$ and the CNOT output state $|S2\rangle$ are suitable for use as the basis states for the output representation. Generally, coherent states $|\alpha\rangle$ and $|e^{i\chi}\alpha\rangle$ satisfy this condition even for relatively small values of $\chi$ if $\alpha$ is large.

In yet another embodiment of the invention, a state converter is implemented through construction of an optical system that provides an evolution operator that directly transforms the basis states for one representation of quantum information to the basis states of another quantum information. Equation 15, for example, shows a Hamiltonian operator H corresponding to an evolution operator that converts an input state $|\phi\rangle_a$ of the form $C_0|0\rangle_a + C_1|1\rangle_a$ to an output state $|\phi\rangle_b$ of the form $C_0|0\rangle_b + C_1|1\rangle_b$. In Equation 15, the coupling constant $\theta$ determines the strength of the interaction and therefore the speed of the state conversion process.

$$H = \hbar\theta[|0\rangle_b\langle 0|_a + |0\rangle_a\langle 0|_b + |1\rangle_b\langle 1|_a + |1\rangle_a\langle 1|_b] \qquad \text{Equation 15}$$

A physical system having a Hamiltonian operator H and an interaction time $\delta t$ that provides the desired evolution can be constructed from a combination of linear devices, quadratic devices, and a higher-order non-linear device that provide interactions between states in the a-channel and the c-channel. S. Lloyd and S. L. Braunstein, "Quantum Computing over Continuous Variables", P.R.L. 82, 1784 (1999) describes a general technique for generating an arbitrary Hamiltonian using a non-linear device with squeezing and displacements. This technique when applied to a photon state $|\phi\rangle$ employs a series of optical elements having separate Hamiltonians $H_1$, $H_2, \ldots, H_N$. The optical elements cause the state $|\phi\rangle$ to evolve as indicated in Equation 16 when $\delta t$ is the interaction time for each optical element and $H_{EFF}$ is the effective combined Hamiltonian. A system or sub-system using a first pair of optical elements having Hamiltonians A and B with a second pair of Hamiltonians $-A$ and $-B$ provides an effective Hamiltonian that is related to the commutator [A,B] as indicated in Equation 17. The commutator of a non-linear polynomial operator such as $(X^2+P^2)^2$ with a linear operator such as X or P is generally a higher order polynomial operator (e.g., $[(X^2+P^2),X]$ is equal to $i(X^2P+PX^2+2P^3)/2$). Using this principle, an arbitrary polynomial Hamiltonian operator can be constructed using an appropriate combination of optical elements having linear and quadratic Hamiltonian operators with one type of optical element having a higher-order non-linear Hamiltonian operator.

$$e^{iH_{EFF}\delta t}|\phi\rangle = e^{iH_N\delta t}\ldots e^{iH_2\delta t}e^{iH_1\delta t}|\phi\rangle \qquad \text{Equation 16}$$

$$e^{iA\delta t}e^{iB\delta t}e^{-iA\delta t}e^{-iB\delta t} = e^{[A,B]\delta t} + O(\delta t^3) \qquad \text{Equation 17}$$

The specific elements used to provide the desired Hamiltonian H of Equation 15 depend on the basis states of the input and output physical representations. For the case of light fields generally, linear and quadratic elements include displacers, phase shifters, beam splitters, and squeezers. A higher order quadratic element can be implemented using a Kerr non-linearity such as created in an EIT system.

Figure 6A:
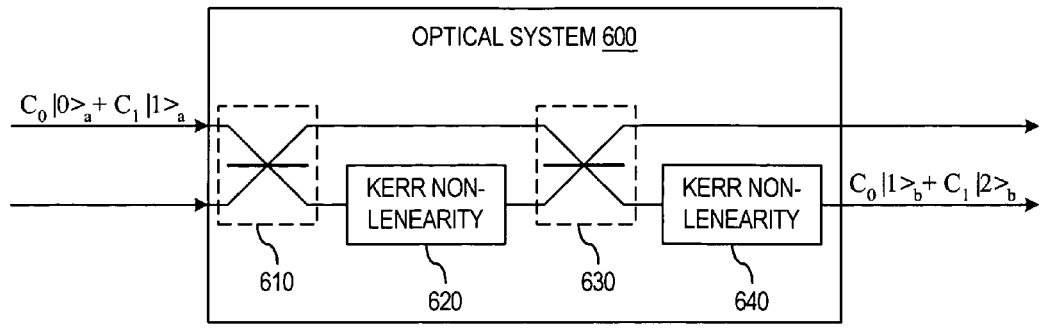
FIGS. 6A and 6B show embodiments of the invention in which optical systems have an effective Hamiltonian that converts quantum information from one physical representation to another.

FIG. 6A illustrates an embodiment of the invention in which as an optical system 600 uses beam splitters 610 and 630 and non-linear elements 620 and 640 to implement a Hamiltonian suitable for a converter. The input state of system 600 is a product of a state $C_0|0\rangle_a + C_1|1\rangle_a$ carrying the quantum information, i.e., coefficients $C_0$ and $C_1$, and a known state $|1\rangle_b$. The information-carrying state $C_0|0\rangle_a + C_1|1\rangle_a$ is in a representation where the basis states $|0\rangle_a$ and $|1\rangle_a$ are Fock states respectively including zero and one photon in an a-channel. Known state $|1\rangle_b$ is a Fock state corresponding to one photon in a b-channel.

Beam splitters 610 and 630, which mix the a-channel and b-channel, have respective Hamiltonian operators A and $-A$, where the operator A given in Equation 18. In one specific embodiment beam splitters 610 and 630 are substantially identical but oriented so that light traverses beam splitter 620 in a direction opposite to the direction with which light traverses beam splitter 630. Non-linear elements 620 and 640, which can be EIT systems or any alternative elements that provide a Kerr non-linearity in the b-channel, have respective Hamiltonian operators B and $-B$, where the operator B given in Equation 19. As a result, the effective Hamiltonian of system 600 is given in Equation 20. In Equations 18, 19, and 20, operators $\hat{a}^\dagger$ and $\hat{a}$ are respectively creation and annihilation operators for the a-channel, and $\hat{b}^\dagger$ and $\hat{b}$ are respectively creation and annihilation operators for the b-channel.

$$A = \theta(\hat{a}^\dagger \hat{b} + \hat{a}\hat{b}^\dagger) \qquad \text{Equation 18}$$

$$B = \chi \hat{b}^\dagger \hat{b}^\dagger \hat{b}\hat{b} \qquad \text{Equation 19}$$

$$H_{eff} = 2\theta\chi(\hat{a}^\dagger \hat{b}^\dagger \hat{b}\hat{b} - \hat{a}\hat{b}^\dagger \hat{b}^\dagger \hat{b}) \qquad \text{Equation 20}$$

Figure 6B:
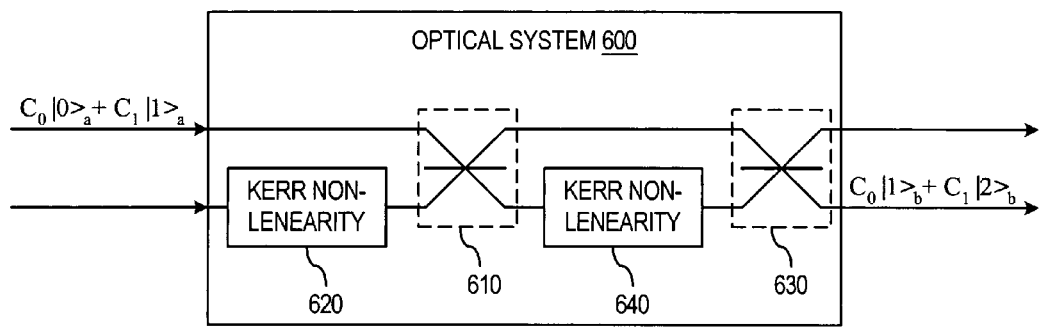

FIG. 6B illustrates an alternative embodiment of the invention that achieves the Hamiltonian of Equation 20 using a different ordering of beam splitters 610 and 630 and non-linear elements 620 and 640. In particular, beam splitters 610 and 630 can either precede respective non-linear elements 620 and 640 as shown in FIG. 6A or follow the respective non-linear elements 620 and 640 as shown in FIG. 6B.

Each element 610, 620, 630, and 640 preferably has the same interaction time t, so that the evolution of input state is indicated in Equation 21. Equation 22 is a simplification of Equation 21 arising because an annihilation operator $\hat{a}$ or $\hat{b}$ operating on the vacuum state is 0. Couplings $\theta$ and $\chi$ and interaction time t, control the values of constants $k_1$ and $k_2$ in Equation 22 and can be adjusted so that $k_1$ is zero and magnitude $|k_2|$ is one. With $k_1$ equal to zero, the output state is a factorable and includes a state $|\phi\rangle_b$ in the b-channel that represents the quantum information ($C_0$ and $C_1$) in a physical representation where the basis states $|1\rangle_b$ and $|2\rangle_b$ are Fock states respectively corresponding to one and two photons in the b-channel.

Equation 21:
$$e^{iH_{eff}t}|\varphi\rangle_a \otimes |1\rangle_b = e^{i2\theta\chi t(\hat{a}^\dagger\hat{b}^\dagger\hat{b}\hat{b} - \hat{a}\hat{b}^\dagger\hat{b}^\dagger\hat{b})}(C_0|0\rangle_a|1\rangle_b + C_1|1\rangle_a|1\rangle_b)$$

Equation 22:
$$e^{iH_{eff}t}|\varphi\rangle_a \otimes |1\rangle_b = C_0|0\rangle_a|1\rangle_b + k_1 C_1|1\rangle_a|1\rangle_b + k_2 C_1|0\rangle_a|2\rangle_b$$
$$= C_0|0\rangle_a|1\rangle_b + C_1|0\rangle_a|2\rangle_b$$
$$= |0\rangle_a \otimes |\varphi\rangle_b$$

Figure 7:
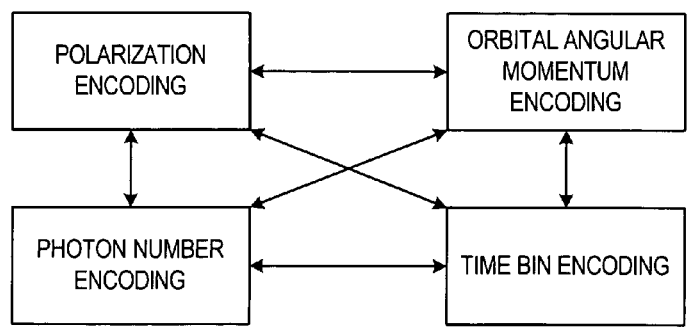
FIG. 7 illustrates some conversions of physical encodings for quantum information.

As described above, state converters in accordance with specific embodiments of the invention can perform a general conversion from a photon state using one physical representation for quantum information to a photon state using another physical representation of the quantum information. The general conversion can include conversion of physical encodings where the property of the photon state such as photon number, polarization, time bin, or orbital angular momentum that distinguishes the quantum values is converted to another physical encoding where a different physical property distinguishes quantum values as illustrated in FIG. 7. Additional or alternative conversion can transfer an initial physical type of underlying photon state, e.g., a state of photons of a particular frequency, to a photon state of a different type, e.g., a state of photons of a different frequency, while at the same time either changing or preserving the physical encoding, e.g., photon number, polarization, spatial channel, time bin, or orbital angular momentum, used to distinguish different quantum values.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A system comprising:
   a channel for an input photon state that uses a first physical representation for quantum information; and
   a photo-interactive system that interacts with the input photon state to generate an output photon state using a second physical representation for the quantum information, wherein:
   the first physical representation uses a first property to encode the quantum information; and
   the second physical representation uses a second property to encode the quantum information, the second property differing from the first property.

2. The system of claim 1, wherein the input photon state corresponds to photons having a first frequency and the output photon state corresponds to photons having a second frequency that differs from the first frequency.

3. The system of claim 1, wherein each of the first property and the second property is selected from the group consisting of polarization, photon number, time bin, and angular momentum.

4. The system of claim 1, wherein the photo-interactive system comprises a swap gate.

5. The system of claim 1, wherein the photo-interactive system comprises:
   a first controlled phase gate into which a known photon state is input, wherein the input photon state controls action of the first controlled phase gate on the known photon state;
   a first Hadamard gate that operates on the input photon state;
   a second Hadamard gate that operates on a state resulting from operation of the first controlled phase gate on the known photon state; and
   a second controlled phase gate in which a photon state output from the second Hadamard gate controls operation of the second controlled phase gate on a state output from the first Hadamard gate.

6. The system of claim 1, wherein the photo-interactive system comprises a teleporter.

7. The system of claim 1, wherein the photo-interactive system provides a Hamiltonian operator that evolves basis states of the first physical representation into basis states of the second physical representation.

8. The system of claim 1, wherein:
   the first physical representation uses a first basis state corresponding to a photon being in a first channel and a second basis state corresponding to the photon being in a second channel; and
   the photo-interactive system comprises:
   a first controlled phase gate into which a first known photon state is input, wherein a state of the first channel controls action of the first controlled phase gate on the first known photon state;
   a beam splitter positioned to receive photons from the first channel and the second channel, the beam splitter mixing photon states on the first channel and the second channel to provide photon states on a third channel and a fourth channel;
   a detector system that measures whether the photon associated with the first and second basis states of the first physical representation is in the third channel or the fourth channel; and
   a corrective system under control of the detector system, wherein the corrective system alters a state output from the first controlled phase gate according to whether the photon is in the third channel or the fourth channel.

9. The system of claim 8, wherein the photo-interactive system further comprises a second controlled phase gate into which a second known photon state is input, wherein a state of the second channel controls action of the second controlled phase gate on the second known photon state, wherein the output photon state comprises entangled states output from the first controlled phase gate and the second control phase gate.

10. The system of claim 8, wherein the first known photon state comprises a coherent state.

11. A method comprising:
- interacting an input photon state that uses a first photonic representation of quantum information with a known photon state that uses a second photonic representation; and
- using an output photon state that results from the interaction to represent the quantum information using the second photonic representation.

12. The method of claim 11, wherein the first photonic representation employs photons having a first frequency, and the second photonic representation employs photons having a second frequency that differs from the first frequency.

13. The method of claim 11, wherein the first photonic representation uses a first property to encode the quantum information, and the second photonic representation uses a second property to encode the quantum information, the second property differing from the first property.

14. The method of claim 13, wherein each of the first property and the second property is selected from the group consisting of polarization, photon number, time bin, and angular momentum.

15. The method of claim 11, further comprising discarding a second output photon state that results from the interaction, wherein the second output photon state uses the first representation.

16. The method of claim 11, wherein interacting the input photon state and the known photon state comprises directing the input photon state and the known photon state into a swap gate.

17. The method of claim 11, wherein interacting the input photon state and the known photon state comprises directing the input photon state and the known photon state into a teleporter.

18. The method of claim 11, wherein interacting the input photon state and the known photon state comprises directing the input photon state into a photo-interactive system that provides a Hamiltonian operator that evolves basis states of the first physical representation into basis states of the second physical representation.

19. The method of claim 11, wherein:
- the input photon state is a combination of a first basis state corresponding to a photon being in a first channel and a second basis state corresponding to the photon being in a second channel; and wherein
- interacting the input photon state and the known photon state comprises:
- controlling a controlled phase gate through which the known photon state passes with a state of the first channel;
- mixing states of the first channel and the second channel through a beam splitter to create states of a third channel and a fourth channel; and
- altering an output state of the controlled phase gate according to a photon measurement in the third channel or the fourth channel.

* * * * *

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

On the face page, in field (73), in "Assignee", in column 1, line 2, delete "Houston (JP)" and insert -- Houston, TX (US) --, therefor.

On sheet 1 of 4, Fig. 1A, in tag 110, delete " $|\varphi>_a$ " and insert -- $|\varphi\rangle_a$ --, therefor.

On sheet 1 of 4, Fig. 1A, in tag 110, delete " $|0>_c$ " and insert -- $|0\rangle_c$ --, therefor.

On sheet 1 of 4, Fig. 1A, in tag 120, delete " $|0>_a$ " and insert -- $|0\rangle_a$ --, therefor.

On sheet 1 of 4, Fig. 1A, in tag 120, delete " $|\varphi>_c$ " and insert -- $|\varphi\rangle_c$ --, therefor.

On sheet 1 of 4, Fig. 1B, below tag 130, delete " $|\varphi>_a$ " and insert -- $|\varphi\rangle_a$ --, therefor.

On sheet 1 of 4, Fig. 1B, near tag 124, delete " $|\varphi>_c$ " and insert -- $|\varphi\rangle_c$ --, therefor.

On sheet 2 of 4, Fig. 3, delete " $|4>$ " and insert -- $|4\rangle$ --, therefor.

On sheet 2 of 4, Fig. 3, delete " $|2>$ " and insert -- $|2\rangle$ --, therefor.

On sheet 2 of 4, Fig. 3, delete " $|3>$ " and insert -- $|3\rangle$ --, therefor.

On sheet 2 of 4, Fig. 3, delete " $|1>$ " and insert -- $|1\rangle$ --, therefor.

On sheet 2 of 4, Fig. 4A, delete " $|\varphi>_a$ " and insert -- $|\varphi\rangle_a$ --, therefor.

On sheet 2 of 4, Fig. 4A, delete " $|\varphi>_d$ " and insert -- $|\varphi\rangle_d$ --, therefor.

On sheet 2 of 4, Fig. 4B, delete " $C_0|H>_a+C_1|V>_a$ " and insert -- $C_0|H\rangle_a+C_1|V\rangle_a$ --, therefor.

On sheet 2 of 4, Fig. 4B, delete " $C_0|0>_d+C_1|1>_d$ " and insert -- $C_0|0\rangle_d+C_1|1\rangle_d$ --, therefor.

On sheet 3 of 4, Fig. 5A, delete " $|\alpha_B>$ " and insert -- $|\alpha_B\rangle$ --, therefor.

On sheet 3 of 4, Fig. 5A, delete " $|\varphi>_{OUT}$ " and insert -- $|\varphi\rangle_{OUT}$ --, therefor.

On sheet 3 of 4, Fig. 5A, delete " $|\varphi>_{IN}$ " and insert -- $|\varphi\rangle_{IN}$ --, therefor.

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

On sheet 3 of 4, Fig. 5B, delete " $|\alpha_2>_2$ " and insert -- $|\alpha_2\rangle_2$ --, therefor.

On sheet 3 of 4, Fig. 5B, delete " $|\varphi>_{IN}$ " and insert -- $|\varphi\rangle_{IN}$ --, therefor.

On sheet 3 of 4, Fig. 5B, delete " $|\varphi>_{OUT}$ " and insert -- $|\varphi\rangle_{OUT}$ --, therefor.

On sheet 3 of 4, Fig. 5B, delete " $|\alpha_1>_1$ " and insert -- $|\alpha_1\rangle_1$ --, therefor.

On sheet 4 of 4, Fig. 6A, delete " $C_0|0>_a + C_1|1>_a$ " and insert -- $C_0|0\rangle_a + C_1|1\rangle_a$ --, therefor.

On sheet 4 of 4, Fig. 6A, delete " $C_0|1>_b + C_1|2>_b$ " and insert -- $C_0|1\rangle_b + C_1|2\rangle_b$ --, therefor.

On sheet 4 of 4, Fig. 6B, delete " $C_0|0>_a + C_1|1>_a$ " and insert -- $C_0|0\rangle_a + C_1|1\rangle_a$ --, therefor.

On sheet 4 of 4, Fig. 6B, delete " $C_0|1>_b + C_1|2>_b$ " and insert -- $C_0|1\rangle_b + C_1|2\rangle_b$ --, therefor.

In column 1, line 15, delete " $|H>$ and $|V>$ " and insert -- $|H\rangle$ and $|V\rangle$ --, therefor.

In column 1, line 16, delete " $|R>$ and $|L>$ " and insert -- $|R\rangle$ and $|L\rangle$ --, therefor.

In column 1, line 19, delete " $|0>$ and $|1>$ " and insert -- $|0\rangle$ and $|1\rangle$ --, therefor.

In column 1, line 20, delete " $|0>$ and $|1>$ " and insert -- $|0\rangle$ and $|1\rangle$ --, therefor.

In column 1, line 33, delete " $|0>$ to $|d-1>$ " and insert -- $|0\rangle$ to $|d-1\rangle$ --, therefor.

In column 1, line 42, delete " $|\alpha>$ " and insert -- $|\alpha\rangle$ --, therefor.

In column 2, line 65, delete " $|\phi>_a$ " and insert -- $|\varphi\rangle_a$ --, therefor.

In column 2, line 66, delete " $|0>_c$ " and insert -- $|0\rangle_c$ --, therefor.

In column 2, line 67, delete " $|\phi>_a$ " and insert -- $|\varphi\rangle_a$ --, therefor.

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

In column 3, line 1, delete "$|0\rangle_a$ and $|1\rangle_a$" and insert -- $|0\rangle_a$ and $|1\rangle_a$ --, therefor.

In column 3, line 2, delete "$|0\rangle_c$" and insert -- $|0\rangle_c$ --, therefor.

In column 3, line 5, delete "$|0\rangle_a$ and $|1\rangle_a$" and insert -- $|0\rangle_a$ and $|1\rangle_a$ --, therefor.

In column 3, lines 5-6, delete "$|H\rangle_a$ and $|V\rangle_a$" and insert -- $|H\rangle_a$ and $|V\rangle_a$ --, therefor.

In column 3, line 6, delete "$|0\rangle_c$" and insert -- $|0\rangle_c$ --, therefor.

In column 3, line 7, delete "$|H\rangle_c$ and $|V\rangle_c$" and insert -- $|H\rangle_c$ and $|V\rangle_c$ --, therefor.

In column 3, line 10, delete "$|\phi\rangle_a$" and insert -- $|\varphi\rangle_a$ --, therefor.

In column 3, line 11, delete "$|\phi\rangle_c$" and insert -- $|\varphi\rangle_c$ --, therefor.

In column 3, line 12, delete "$|\phi\rangle_a \otimes |0\rangle_c = [C_0|0\rangle_a + C_1|1\rangle_a] \otimes |0\rangle_c$" and insert -- $|\varphi\rangle_a \otimes |0\rangle_c = [C_0|0\rangle_a + C_1|1\rangle_a] \otimes |0\rangle_c$ --, therefor.

In column 3, line 13, delete "$|\phi\rangle_a$" and insert -- $|\varphi\rangle_a$ --, therefor.

In column 3, line 19, delete "$|\phi\rangle_a$" and insert -- $|\varphi\rangle_a$ --, therefor.

In column 3, line 20, delete "$|\phi\rangle_c$" and insert -- $|\varphi\rangle_c$ --, therefor.

In column 3, line 21, delete "$|0\rangle_a$" and insert -- $|0\rangle_a$ --, therefor.

In column 3, line 54, delete "$|\phi\rangle_c$" and insert -- $|\varphi\rangle_c$ --, therefor.

In column 3, line 67, delete "$|0\rangle_a$ and $|1\rangle_a$" and insert -- $|0\rangle_a$ and $|1\rangle_a$ --, therefor.

In column 4, line 3, delete "$|0\rangle_c$ and $|1\rangle_c$" and insert -- $|0\rangle_c$ and $|1\rangle_c$ --, therefor.

In column 4, line 15, delete "$|\phi\rangle_a$" and insert -- $|\varphi\rangle_a$ --, therefor.

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

In column 4, line 16, delete " $|0\rangle_a$ and $|1\rangle_a$ " and insert -- $|0\rangle_a$ and $|1\rangle_a$ --, therefor.

In column 4, line 17, delete " $|H\rangle_a$ and $|V\rangle_a$ " and insert -- $|H\rangle_a$ and $|V\rangle_a$ --, therefor.

In column 4, line 18, delete " $|\phi\rangle_c$ " and insert -- $|\varphi\rangle_c$ --, therefor.

In column 4, line 19, delete " $|\phi\rangle_a$ " and insert -- $|\varphi\rangle_a$ --, therefor.

In column 4, line 20, delete " $|0\rangle_c$ and $|1\rangle_c$ " and insert -- $|0\rangle_c$ and $|1\rangle_c$ --, therefor.

In column 4, line 21, delete " $|H\rangle_c$ and $|V\rangle_c$ " and insert -- $|H\rangle_c$ and $|V\rangle_c$ --, therefor.

In column 4, line 36, delete " $|1\rangle_a$ and $|1\rangle_c$ " and insert -- $|1\rangle_a$ and $|1\rangle_c$ --, therefor.

In column 4, line 40, delete " $|1\rangle_a$ " and insert -- $|1\rangle_a$ --, therefor.

In column 4, line 42, delete " $|1\rangle_a$ " and insert -- $|1\rangle_a$ --, therefor.

In column 4, line 44, delete " $|1\rangle_a$ " and insert -- $|1\rangle_a$ --, therefor.

In column 4, line 45, delete " $|1\rangle, |2\rangle, |3\rangle,$ and $|4\rangle$ " and insert -- $|1\rangle, |2\rangle, |3\rangle,$ and $|4\rangle$ --, therefor.

In column 4, line 47, delete " $|3\rangle$ " and insert -- $|3\rangle$ --, therefor.

In column 4, line 48, delete " $|3\rangle$ " and insert -- $|3\rangle$ --, therefor.

In column 4, line 49, delete " $|1\rangle,$ " and insert -- $|1\rangle,$ --, therefor.

In column 4, line 50, delete " $|4\rangle$ " and insert -- $|4\rangle$ --, therefor.

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

In column 4, line 52, delete " $|1\rangle$ and $|2\rangle$, $|2\rangle$ and $|3\rangle$, and $|3\rangle$ " and insert -- $|1\rangle$ and $|2\rangle$, $|2\rangle$ and $|3\rangle$, and $|3\rangle$ --, therefor.

In column 4, line 53, delete " $|4\rangle$ " and insert -- $|4\rangle$ --, therefor.

In column 4, line 53, delete " $\vartheta_b$ " and insert -- $\nu_b$ --, therefor.

In column 4, line 67, delete " $|1\rangle_a |1\rangle_c$, " and insert -- $|1\rangle_a |1\rangle_c$, --, therefor.

In column 5, line 1, delete " $|0\rangle_a |0\rangle_c$, $|0\rangle_a |1\rangle_c$, or $|1\rangle_a |0\rangle_c$ " and insert -- $|0\rangle_a |0\rangle_c$, $|0\rangle_a |1\rangle_c$, or $|1\rangle_a |0\rangle_c$ --, therefor.

In column 5, line 10, delete " $|1\rangle_a$ " and insert -- $|1\rangle_a$ --, therefor.

In column 5, line 14, delete " $|\phi\rangle_c$ " and insert -- $|\varphi\rangle_c$ --, therefor.

In column 5, line 18, delete " $|\phi\rangle_a$ " and insert -- $|\varphi\rangle_a$ --, therefor.

In column 5, line 19, delete " $|\phi\rangle_d$ " and insert -- $|\varphi\rangle_d$ --, therefor.

In column 5, line 24, delete " $|\phi\rangle_a$ " and insert -- $|\varphi\rangle_a$ --, therefor.

In column 5, line 33, delete " $|\phi\rangle_{d'}$ " and insert -- $|\varphi\rangle_{d'}$ --, therefor.

In column 5, line 34, delete " $|\phi\rangle_a$ " and insert -- $|\varphi\rangle_a$ --, therefor.

In column 5, line 46, delete " $|\phi\rangle_a$ " and insert -- $|\varphi\rangle_a$ --, therefor.

In column 5, line 48, delete " $|\phi\rangle_{a'}$ " and insert -- $|\varphi\rangle_{a'}$ --, therefor.

In column 5, line 66, delete " $|0\rangle_a |0\rangle_c$, $|0\rangle_a |1\rangle_c$, " and insert -- $|0\rangle_a |0\rangle_c$, $|0\rangle_a |1\rangle_c$, --, therefor.

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

In column 5, line 67, delete " $|1\rangle_a |0\rangle_c$, or $|1\rangle_a |1\rangle_c$ " and insert -- $|1\rangle_a |0\rangle_c$, or $|1\rangle_a |1\rangle_c$ --, therefor.

In column 6, line 1, delete " $C_0 |0\rangle_c + C_1 |1\rangle_c$, " and insert -- $C_0 |0\rangle_c + C_1 |1\rangle_c$, --, therefor.

In column 6, line 2, delete " $C_0 |1\rangle_c + C_1 |0\rangle_c, C_0 |0\rangle_c - C_1 |1\rangle_c, \text{or} C_0 |1\rangle_c - C_1 |0\rangle_c.$ " and insert -- $C_0 |1\rangle_c + C_1 |0\rangle_c, C_0 |0\rangle_c - C_1 |1\rangle_c, \text{or } C_0 |1\rangle_c - C_1 |0\rangle_c.$ --, therefor.

In column 6, line 6, delete " $|1\rangle_a$, " and insert -- $|1\rangle_a$, --, therefor.

In column 6, line 8, delete " $|1\rangle_c.$ " and insert -- $|1\rangle_c.$ --, therefor.

In column 6, line 9, delete " $|\phi\rangle_d$ " and insert -- $|\phi\rangle_d$ --, therefor.

In column 6, line 9, delete " $C_0 |0\rangle_d + C_1 |1\rangle_d$ " and insert -- $C_0 |0\rangle_d + C_1 |1\rangle_d$ --, therefor.

In column 6, lines 13-19, delete

"
| Measured ac-channel | Implied c-channel | Gate X | Gate Z | Final State |
| --- | --- | --- | --- | --- |
| $|0\rangle_a |0\rangle_c$ | $C_0 |0\rangle_b + C_1 |1\rangle_b$ | Inactive | Inactive | $C_0 |0\rangle_b + C_1 |1\rangle_b$ |
| $|0\rangle_a |1\rangle_c$ | $C_0 |1\rangle_b + C_1 |0\rangle_b$ | Active | Inactive | $C_0 |0\rangle_b + C_1 |1\rangle_b$ |
| $|1\rangle_a |0\rangle_c$ | $C_0 |0\rangle_b - C_1 |1\rangle_b$ | Inactive | Active | $C_0 |0\rangle_b + C_1 |1\rangle_b$ |
| $|1\rangle_a |1\rangle_c$ | $C_0 |1\rangle_b - C_1 |0\rangle_b$ | Active | Active | $C_0 |0\rangle_b + C_1 |1\rangle_b$ |

" and

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

insert --

| Measured ac-channel | Implied c-channel | Gate X | Gate Z | Final State |
|---|---|---|---|---|
| $\|0\rangle_a \|0\rangle_c$ | $C_0\|0\rangle_b + C_1\|1\rangle_b$ | Inactive | Inactive | $C_0\|0\rangle_b + C_1\|1\rangle_b$ |
| $\|0\rangle_a \|1\rangle_c$ | $C_0\|1\rangle_b + C_1\|0\rangle_b$ | Active | Inactive | $C_0\|0\rangle_b + C_1\|1\rangle_b$ |
| $\|1\rangle_a \|0\rangle_c$ | $C_0\|0\rangle_b - C_1\|1\rangle_b$ | Inactive | Active | $C_0\|0\rangle_b + C_1\|1\rangle_b$ |
| $\|1\rangle_a \|1\rangle_c$ | $C_0\|1\rangle_b - C_1\|0\rangle_b$ | Active | Active | $C_0\|0\rangle_b + C_1\|1\rangle_b$ |

--, therefor.

In column 6, line 36, delete " $|H>_a$ and $|V>_a$ " and insert -- $|H\rangle_a$ and $|V\rangle_a$ --, therefor.

In column 6, line 37, delete " $|0>_d$ and $|>_d$. " and insert -- $|0\rangle_d$ and $|1\rangle_d$. --, therefor.

In column 6, line 38, delete " $C_0|H>+C_1|V>.$ " and insert -- $C_0|H\rangle + C_1|V\rangle.$ --, therefor.

In column 6, line 40, delete " $|0>_c|0>_d$ " and insert -- $|0\rangle_c|0\rangle_d$ --, therefor.

In column 6, line 41, delete " $|1>_c|1>_d$ " and insert -- $|1\rangle_c|1\rangle_d$ --, therefor.

In column 6, line 49, delete " $|V>$ " and insert -- $|V\rangle$ --, therefor.

In column 6, line 50, delete " $|H>$ " and insert -- $|H\rangle$ --, therefor.

In column 6, line 52, delete " $|0>_c$ and $|1>_c$ " and insert -- $|0\rangle_c$ and $|1\rangle_c$ --, therefor.

In column 6, line 57, delete " $0>_d$ and $|1>_d$ " and insert -- $|0\rangle_d$ and $|1\rangle_d$ --, therefor.

In column 6, line 58, delete " $|0>_c$ and $|1>_c.$ " and insert -- $|0\rangle_c$ and $|1\rangle_c.$ --, therefor.

In column 6, line 59, delete " $|0>_d$ and $|1>_d$ " and insert -- $|0\rangle_d$ and $|1\rangle_d$ --, therefor.

In column 6, line 60, delete " $|\alpha>$ and $|-\alpha>.$ " and insert -- $|\alpha\rangle$ and $|-\alpha\rangle$ --, therefor.

In column 6, line 60, delete " $|\alpha>$ and $|-\alpha>$ " and insert -- $|\alpha\rangle$ and $|-\alpha\rangle$ --, therefor.

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

In column 6, line 61, delete " $|H\rangle_c$ and $|H\rangle_c$ " and insert -- $|H\rangle_c$ and $|V\rangle_c$ --, therefor.

In column 6, line 67, delete " $|\alpha\rangle$ " and insert -- $|\alpha\rangle$ --, therefor.

In column 7, line 1, delete " $|0\rangle$, " and insert -- $|0\rangle$. --, therefor.

In column 7, line 2, delete " $|0\rangle_c|0\rangle_d+|0\rangle_c|1\rangle_d$ " and insert -- $|0\rangle_c|0\rangle_d+|0\rangle_c|1\rangle_d$ --, therefor.

In column 7, line 3, delete " $|0\rangle_c|\alpha\rangle_d+|1\rangle_c|-\alpha\rangle_{d'}$ " and insert -- $|0\rangle_c|\alpha\rangle_d+|1\rangle_c|-\alpha\rangle_{d'}$ --, therefor.

In column 7, lines 5-6, delete " $H=D(\alpha)|0\rangle_c\langle 0|_d+|0\rangle_d\langle 0|_c D^*(\alpha)+D(-\alpha)|1\rangle_c\langle 1|_d+|1\rangle_d\langle 1|_c D^*(-\alpha)$ " and insert -- $H = D(\alpha)|0\rangle_c\langle 0|_d + |0\rangle_d\langle 0|_c D^*(\alpha) + D(-\alpha)|1\rangle_c\langle 1|_d + |1\rangle_d\langle 1|_c D^*(-\alpha)$ --, therefor.

In column 7, line 21, delete " $|\phi\rangle_{IN}$ " and insert -- $|\varphi\rangle_{IN}$ --, therefor.

In column 7, line 22, delete " $|0\rangle_{IN}$ and $|1\rangle_{IN}$ " and insert -- $|0\rangle_{IN}$ and $|1\rangle_{IN}$ --, therefor.

In column 7, line 23, delete " $|0\rangle_A$ and $|1\rangle_A$ " and insert -- $|0\rangle_A$ and $|1\rangle_A$ --, therefor.

In column 7, line 25, delete " $|0\rangle_B$ and $|1\rangle_B$ "and insert -- $|0\rangle_B$ and $|1\rangle_B$ --, therefor.

In column 7, line 29, delete " $|\alpha\rangle$ " and insert -- $|\alpha\rangle$ --, therefor.

In column 7, line 33, delete " $|\phi\rangle_{IN}=C_0|0\rangle_{IN}+C_1|1\rangle_{IN}=C_0|1\rangle_A|0\rangle_B+C_1|0\rangle_A|1\rangle_B$ " and insert -- $|\varphi\rangle_{IN} = C_0|0\rangle_{IN} + C_1|1\rangle_{IN} = C_0|1\rangle_A|0\rangle_B + C_1|0\rangle_A|1\rangle_B$ --, therefor.

In column 7, line 35, delete " $|\phi\rangle_{IN}\otimes|\alpha\rangle=C_0|1\rangle_A|0\rangle_B|\alpha\rangle+C_1|0\rangle_A|1\rangle_B|\alpha\rangle$ " and insert -- $|\varphi\rangle_{IN} \otimes |\alpha\rangle = C_0|1\rangle_A|0\rangle_B|\alpha\rangle + C_1|0\rangle_A|1\rangle_B|\alpha\rangle$ --, therefor.

In column 7, line 41, delete " $|\alpha\rangle$. " and insert -- $|\alpha\rangle$. --, therefor.

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

In column 7, line 45, delete "$|\alpha>,$" and insert -- $|\alpha\rangle,$ --, therefor.

In column 7, line 48, delete "$|\alpha>$" and insert -- $|\alpha\rangle$ --, therefor.

In column 7, line 53, delete "$|\phi>_{IN}\otimes|\alpha>\rightarrow C_0|1>_A|0>_B|\alpha>+C_1|0>_A|1>_B|e^{i\chi}\alpha>$" and insert -- $|\varphi\rangle_{IN}\otimes|\alpha\rangle\rightarrow C_0|1\rangle_A|0\rangle_B|\alpha\rangle+C_1|0\rangle_A|1\rangle_B|e^{i\chi}\alpha\rangle$ --, therefor.

In column 7, line 58, delete "$|0>_C$ and $|1>_C$" and insert -- $|0\rangle_C$ and $|1\rangle_C$ --, therefor.

In column 7, line 60, delete "$|0>_D$ and $|1>_D$" and insert -- $|0\rangle_D$ and $|1\rangle_D$ --, therefor.

In column 8, line 18, delete "$(-C_0|\alpha>+C_1|e^{i\chi}\alpha>)$" and insert -- $\left(-C_0|\alpha\rangle+C_1|e^{i\chi}\alpha\rangle\right)$ --, therefor.

In column 8, line 19, delete "$(C_0|\alpha>+C_1|e^{i\chi}\alpha>)$" and insert -- $\left(C_0|\alpha\rangle+C_1|e^{i\chi}\alpha\rangle\right)$ --, therefor.

In column 8, line 21, delete "$|\phi>_{OUT}$" and insert -- $|\varphi\rangle_{OUT}$ --, therefor.

In column 8, lines 21-22, delete "$(C_0|\alpha>+C_1|e^{i\chi}\alpha>),$" and insert -- $\left(C_0|\alpha\rangle+C_1|e^{i\chi}\alpha\rangle\right),$ --, therefor.

In column 8, line 22, delete "$|\alpha>$ and $|e^{i\chi}\alpha>$, e.g., $|\alpha>$ and $|-\alpha>$" and insert -- $|\alpha\rangle$ and $|e^{i\chi}\alpha\rangle$, e.g., $|\alpha\rangle$ and $|-\alpha\rangle$ --, therefor.

In column 8, line 23, delete "$|0>_{OUT}$ and $|1>_{OUT}$" and insert -- $|0\rangle_{OUT}$ and $|1\rangle_{OUT}$ --, therefor.

In column 8, lines 35-36, delete "$(-C_0|\alpha\rangle+C_1|e^{i\chi}\alpha>)$" and insert -- $\left(-C_0|\alpha\rangle+C_1|e^{i\chi}\alpha\rangle\right)$ --, therefor.

UNITED STATES PATENT AND TRADEMARK OFFICE
CERTIFICATE OF CORRECTION

PATENT NO.         : 7,449,672 B2
APPLICATION NO. : 10/837129
DATED                  : November 11, 2008
INVENTOR(S)        : Raymond G. Beausoleil, Jr. et al.

It is certified that error appears in the above-identified patent and that said Letters Patent is hereby corrected as shown below:

In column 8, line 38, delete " $|\phi\rangle_{OUT}$ " and insert -- $|\varphi\rangle_{OUT}$ --, therefor.

In column 8, line 38, delete " $(C_0|\alpha\rangle + C_1|e^{ix}\rangle).$ " and insert -- $\left(C_0|\alpha\rangle + C_1|e^{ix}\alpha\rangle\right)$ --, therefor.

In column 8, line 43, delete " $|\phi\rangle_{IN}$ " and insert -- $|\varphi\rangle_{IN}$ --, therefor.

In column 8, line 44, delete " $|\alpha_1\rangle_1$ and $|\alpha_2\rangle_2.$ " and insert -- $|\alpha_1\rangle_1$ and $|\alpha_2\rangle_2.$ --, therefor.

In column 8, line 44, delete " $|\phi\rangle_{IN}$ " and insert -- $|\varphi\rangle_{IN}$ --, therefor.

In column 8, lines 48-49, delete " $|\phi\rangle_{IN}\otimes|\alpha_1\rangle_1\otimes|\alpha_2\rangle_2 = C_0|1\rangle_A|0\rangle_B|\alpha_1\rangle_1|\alpha_2\rangle_2 + C_1|0\rangle_A|1\rangle_B|\alpha_1\rangle_1|\alpha_2\rangle_2$ " and insert -- $|\varphi\rangle_{IN}\otimes|\alpha_1\rangle_1\otimes|\alpha_2\rangle_2 = C_0|1\rangle_A|0\rangle_B|\alpha_1\rangle_1|\alpha_2\rangle_2 + C_1|0\rangle_A|1\rangle_B|\alpha_1\rangle_1|\alpha_2\rangle_2$ --, therefor.

In column 8, line 52, delete " $|\alpha_1\rangle_1,$ " and insert -- $|\alpha_1\rangle_1,$ --, therefor.

In column 8, line 54, delete " $|\alpha_2\rangle_2.$ " and insert -- $|\alpha_2\rangle_2.$ --, therefor.

In column 8, line 59, delete " $|\alpha_2\rangle_2$ and $|\alpha_1\rangle_1$ " and insert -- $|\alpha_2\rangle_2$ and $|\alpha_1\rangle_1$ --, therefor.

In column 8, lines 64-65, delete " $|\phi\rangle_{IN}\otimes|\alpha\rangle \rightarrow C_0|1\rangle_A|0\rangle_B|e^{ix_1}\alpha_1\rangle_1|\alpha_2\rangle_2 + C_1|0\rangle_A|1\rangle_B|\alpha_1\rangle_1|e^{ix_2}\alpha\rangle_2$ " and insert -- $|\varphi\rangle_{IN}\otimes|\alpha\rangle \rightarrow C_0|1\rangle_A|0\rangle_B|e^{ix_1}\alpha_1\rangle_1|\alpha_2\rangle_2 + C_1|0\rangle_A|1\rangle_B|\alpha_1\rangle_1|e^{ix_2}\alpha\rangle_2$ --, therefor.

In column 9, line 2, delete " $|0\rangle_C$ and $|1\rangle_C$ " and insert -- $|0\rangle_C$ and $|1\rangle_C$ --, therefor.

In column 9, lines 3-4, delete " $|0\rangle_D$ and $|1\rangle_D$ " and insert -- $|0\rangle_D$ and $|1\rangle_D$ --, therefor.

In column 9, line 21, delete " $(-C_0|\alpha_1 e^{ix_1}\rangle_1|\alpha_2\rangle_2 + C_1|\alpha_1\rangle_1|\alpha_2 e^{ix_2}\rangle_2)$ " and insert -- $\left(-C_0|\alpha_1 e^{ix_1}\rangle_1|\alpha_2\rangle_2 + C_1|\alpha_1\rangle_1|\alpha_2 e^{ix_2}\rangle_2\right)$ --, therefor.

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

In column 9, line 22, delete " $(C_0|\alpha_1 e^{i\chi_1}>_1|\alpha_2>_2 + C_1|\alpha_1>_1|\alpha_2 e^{i\chi_2}>_2).$ " and insert -- $\left(C_0\left|\alpha_1 e^{i\chi_1}\right\rangle_1|\alpha_2\rangle_2 + C_1|\alpha_1\rangle_1\left|\alpha_2 e^{i\chi_2}\right\rangle_2\right).$ --, therefor.

In column 9, line 40, delete " $|S1>$ " and insert -- $|S1\rangle$ --, therefor.

In column 9, line 42, delete " $|S1>$ " and insert -- $|S1\rangle$ --, therefor.

In column 9, line 43, delete " $|S2>$ " and insert -- $|S2\rangle$ --, therefor.

In column 9, line 44, delete " $|<S2|S1>|^2$ " and insert -- $|\langle S2|S1\rangle|^2$ --, therefor.

In column 9, line 45, delete " $|S1>$ " and insert -- $|S1\rangle$ --, therefor.

In column 9, line 46, delete " $|S2>$ " and insert -- $|S2\rangle$ --, therefor.

In column 9, line 47, delete " $|\alpha>$ " and insert -- $|\alpha\rangle$ --, therefor.

In column 9, line 48, delete " $|e^{i\chi}\alpha>$ " and insert -- $|e^{i\chi}\alpha\rangle$ --, therefor.

In column 9, line 57, delete " $|\varphi>_a$ " and insert -- $|\varphi\rangle_a$ --, therefor.

In column 9, line 57, delete " $C_0|0>_a + C_1|1>_a$ " and insert -- $C_0|0\rangle_a + C_1|1\rangle_a$ --, therefor.

In column 9, line 58, delete " $|\varphi>_b$ " and insert -- $|\varphi\rangle_b$ --, therefor.

In column 9, line 58, delete " $C_0|0>_b + C_1|1>_b.$ " and insert -- $C_0|0\rangle_b + C_1|1\rangle_b.$ --, therefor.

In column 9, line 62, delete " $H=\hbar\theta[|0>_b<0|_a + |0>_a<0|_b + |1>_b<1|_a + |1>_a<1|_b]$ " and insert -- $H = \hbar\theta\left[|0\rangle_b\langle 0|_a + |0\rangle_a\langle 0|_b + |1\rangle_b\langle 1|_a + |1\rangle_a\langle 1|_b\right]$ --, therefor.

In column 10, line 5, delete " $|\varphi>$ " and insert -- $|\varphi\rangle$ --, therefor.

In column 10, line 7, delete " $|\varphi>$ " and insert -- $|\varphi\rangle$ --, therefor.

UNITED STATES PATENT AND TRADEMARK OFFICE
CERTIFICATE OF CORRECTION

PATENT NO. : 7,449,672 B2
APPLICATION NO. : 10/837129
DATED : November 11, 2008
INVENTOR(S) : Raymond G. Beausoleil, Jr. et al.

It is certified that error appears in the above-identified patent and that said Letters Patent is hereby corrected as shown below:

In column 10, line 23, delete " $e^{iH_{EFF}\delta t}|\phi\rangle = e^{iH_N\delta t} \ldots e^{iH_2\delta t}e^{iH_1\delta t}|\phi\rangle$ " and insert -- $e^{iH_{EFF}\delta t}|\varphi\rangle = e^{iH_N\delta t} \ldots e^{iH_2\delta t}e^{iH_1\delta t}|\varphi\rangle$ --, therefor.

In column 10, line 38, delete " $C_0|0\rangle_a + C_1|1\rangle_a$ " and insert -- $C_0|0\rangle_a + C_1|1\rangle_a$ --, therefor.

In column 10, line 40, delete " $|1\rangle_b$, " and insert -- $|1\rangle_b$. --, therefor.

In column 10, lines 40-41, delete " $C_0|0\rangle_a + C_1|1\rangle_a$ " and insert -- $C_0|0\rangle_a + C_1|1\rangle_a$ --, therefor.

In column 10, lines 41-42, delete " $|0\rangle_a$ and $|1\rangle_a$ " and insert -- $|0\rangle_a$ and $|1\rangle_a$ --, therefor.

In column 10, line 43, delete " $|1\rangle_b$ " and insert -- $|1\rangle_b$ --, therefor.

In column 11, line 13, delete " $|\phi\rangle_b$ " and insert -- $|\varphi\rangle_b$ --, therefor.

In column 11, line 15, delete " $|1\rangle_b$ and $|2\rangle_b$ " and insert -- $|1\rangle_b$ and $|2\rangle_b$ --, therefor Signed and Sealed this Fifteenth Day of September, 2009

David J. Kappos
*Director of the United States Patent and Trademark Office*